No. 860,758. PATENTED JULY 23, 1907.
W. W. MOREY.
NUT LOCK.
APPLICATION FILED JUNE 18, 1906.

Witnesses
Carl Stoughton
Frank G. Campbell

Inventor
Worthie W. Morey.
By Shepherd Parker
Attorneys

UNITED STATES PATENT OFFICE.

WORTHIE W. MOREY, OF COLUMBUS, OHIO.

NUT-LOCK.

No. 860,758.  Specification of Letters Patent.  Patented July 23, 1907.

Application filed June 18, 1906. Serial No. 322,137.

*To all whom it may concern:*

Be it known that I, WORTHIE W. MOREY, a citizen of the United States, residing at Columbus, in the county of Franklin and State of Ohio, have invented certain new and useful Improvements in Nut-Locks, of which the following is a specification.

My invention relates to a nut lock, and has for its object the provision of a device of this character which is adapted to hold a nut or other internally threaded member from turning with relation to a bolt upon which it is screwed.

A further object of the invention is a nut lock comprising a resilient member adapted to be compressed between a nut and the surface against which said nut is screwed, said resilient member carrying a spring tongue which is adapted to engage the threaded portion of a bolt upon which the nut is screwed.

Figure 1:
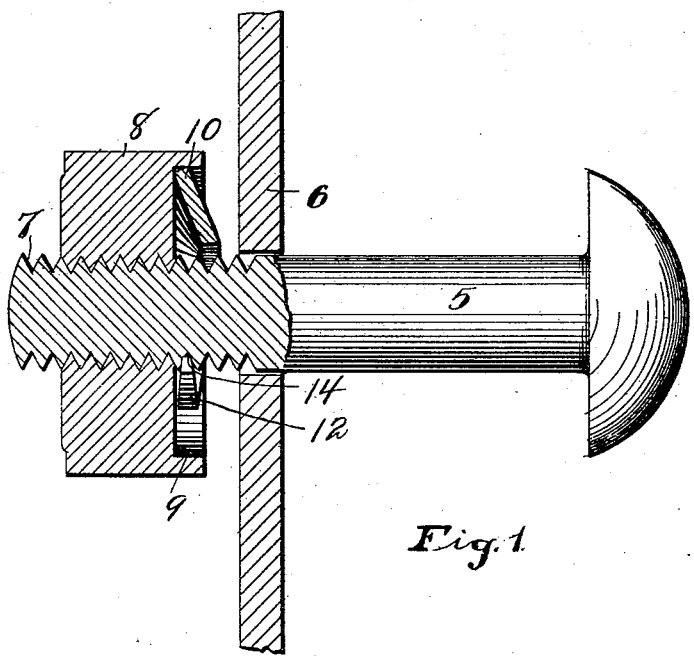
Figure 2:
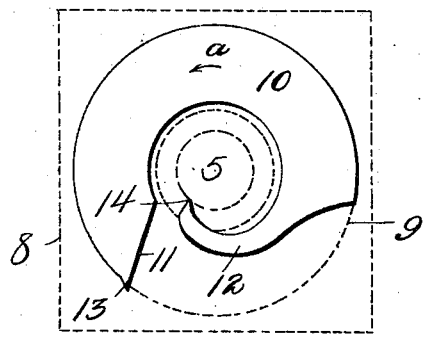

Further objects and advantages of the invention will be set forth in the detailed description which now follows:

In the accompanying drawing: Figure 1 is a vertical section of a nut embodying my invention and illustrating said nut partially screwed upon a bolt, and, Fig. 2 is a front view of a resilient conical washer hereinafter described, with the nut and bolt illustrated in dotted lines.

Like numerals designate corresponding parts in both of the figures of the drawing:

Referring to the drawing, the numeral 5 designates a bolt and the numeral 6 a plate such as a railway fish plate, through which said bolt passes. This bolt is threaded in the usual manner as at 7 and is adapted to receive a nut 8. The nut 8 is provided with an annular recess 9 which is adapted to receive a resilient hardened steel washer 10. This washer is cut away as at 11 and is provided with an inturned resilient tongue 12 which projects between the threads 7 of the bolt. Said washer is also provided with a barb 13 at the junction of its periphery and said cut-away portion, for a purpose which will be hereinafter described. As is best illustrated in Fig. 1, the point of this tongue which is adapted to engage between the threads, is square as at 14, by virtue of which construction the extreme point of said tongue bears against the side walls forming the V between adjacent threads.

As is best illustrated in Fig. 1, the washer 10 is a dished one, by virtue of which said washer possesses sufficient resilience to yield and be forced into the recess 9 when clamped between the nut and the plate 6. As is best illustrated in Fig. 1, the apex of the dished washer lies beyond the inner face of the nut, by virtue of which construction the washer comes into contact with the fish plate, before the inner face of the nut contacts with said plate. The dished washer will therefore create a thrust between the nut and the fish-plate which will tend to resist retrograde movement of the nut. By referring to Fig. 2, it will be seen that the spring tongue 12 is formed upon a curve eccentric to the periphery of the bolt 5. This causes the other end of said tongue to engage the bolt at such an angle that if sufficient force in a retrograde direction be imparted to the nut with a heavy wrench, said spring tongue may be snapped off when it is desired to remove the nut from the bolt.

The operation of this nut lock is as follows: As the nut is screwed up into contact with the plate 6, the conical washer 10 is compressed into the recess 9. This causes the point 14 of the spring tongue 12 to be forced into engagement with the side of the V-thread of the bolt which lies to the left of said tongue in Fig. 1. The rotation of the nut and consequently of the spring washer 10, is in the direction of the arrow *a*, when the nut is being screwed upon the bolt. The point 14 then rides over the threads much in the manner that a pawl rides over a ratchet. While the nut is being screwed upon the bolt, the barb 13 engages the wall of the recess 9 into which the washer is sprung to cause the washer to turn with the nut. The compression of the washer into the recess 9 when the nut is screwed up against the plate 6, forces the periphery of said washer firmly into engagement with the wall of the recess 9 and positively locks the washer to the nut.

It is to be understood that the spring tongue 12 which together with the remainder of the washer is formed of hardened spring steel, bears in the V of the threads of the bolt with considerable force. When there is a tendency of the nut to unscrew from the bolt, the hardened steel point 14 bites into the metal of the bolt and prevents retrograde movement of the nut with relation to said bolt. The resiliency of the dished washer also tends to prevent rotation of the nut with relation to the bolt, for said washer will be compressed to a considerable extent between the nut and the plate. Vibration of the parts caused by passing trains will consequently not cause the nut to work from the bolt.

The device herein shown may be rapidly and cheaply made, the recess 9 of the nut may be formed therein when the nut itself is drop forged. The spring washers 10 may be stamped out and are readily sprung into position in the recesses 9.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. A nut lock comprising a recessed nut having a dished washer seated in the recess of said nut, said dished washer carrying an inwardly directed resilient tongue, the free end of which is reduced to enter between and engage the sides of the threads of a bolt, and a barb formed upon the periphery of said washer and adapted to engage the wall of the recess of the nut.

2. A nut lock comprising a recessed nut, a dished washer seated in the recess of said nut, said dished washer carrying an inwardly directed resilient tongue, the free end of which is reduced to enter between and engage the side of the threads of a bolt, and a barb formed upon the periphery of said washer and adapted to engage the wall of the recess of said nut, the apex of said dished washer projecting beyond the inside face of the nut.

3. In a nut lock, the combination with a nut having an annular recess formed in the inner face thereof, of a dished washer adapted to be seated in and engage the walls of said recess, said dished washer being adapted to encircle a bolt and having a cut-away portion, said washer terminating in a resilient tongue which is curved inwardly upon a curve eccentric to the periphery of the bolt, the free end of said tongue being adapted to engage the threads of a bolt.

4. In a nut lock, the combination with a nut having an annular recess formed in the inner face thereof, of a dished washer adapted to be seated in and engage the walls of said recess, said dished washer being adapted to encircle a bolt and having a cut-away portion, said washer terminating in a resilient tongue which is curved inwardly upon a curve eccentric to the periphery of the bolt, the free end of said tongue being adapted to engage the threads of a bolt, and the apex of the washer projecting beyond the rear face of the nut in such manner as to contact with any surface against which the nut is screwed to thereby provide a resilient means for creating tension between said surface and the nut.

In testimony whereof I affix my signature in presence of two witnesses.

WORTHIE W. MOREY.

Witnesses:
FRANK G. CAMPBELL,
A. L. PHELPS.